(12) United States Patent
Ohyagi et al.

(10) Patent No.: US 9,315,101 B2
(45) Date of Patent: Apr. 19, 2016

(54) DRIVING FORCE DISTRIBUTION CONTROL APPARATUS FOR FOUR-WHEEL DRIVE VEHICLE AND DRIVING FORCE DISTRIBUTION CONTROL METHOD FOR FOUR-WHEEL DRIVE VEHICLE

(71) Applicant: HONDA MOTOR CO., LTD., Tokyo (JP)

(72) Inventors: Shoichi Ohyagi, Wako (JP); Norihisa Nihanda, Wako (JP); Takayuki Seki, Wako (JP); Satoki Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 44 days.

(21) Appl. No.: 14/226,819

(22) Filed: Mar. 27, 2014

(65) Prior Publication Data

US 2014/0297150 A1    Oct. 2, 2014

(30) Foreign Application Priority Data

Mar. 28, 2013   (JP) ................................ 2013-069575
Nov. 5, 2013    (JP) ................................ 2013-229684

(51) Int. Cl.
*B60K 23/08*    (2006.01)
*B60K 17/35*    (2006.01)

(52) U.S. Cl.
CPC ......... *B60K 23/0808* (2013.01); *B60K 17/3505* (2013.01); *B60K 2023/085* (2013.01)

(58) Field of Classification Search
CPC ........... B60K 23/0808; B60K 17/3505; B60K 2023/085

USPC ............................................................ 701/89
See application file for complete search history.

(56) References Cited

U.S. PATENT DOCUMENTS 4,874,059 A * 10/1989 Kasegawa ..................... 180/249
5,270,930 A * 12/1993 Ito et al. .......................... 701/69
5,301,769 A *  4/1994 Weiss ............................ 180/249

(Continued)

FOREIGN PATENT DOCUMENTS

JP      04-103433       4/1992
JP      2002-012049     1/2002

(Continued)

OTHER PUBLICATIONS

Japanese Office Action for corresponding JP Application No. 2013-229684, May 25, 2015.

*Primary Examiner* — Calvin Cheung
*Assistant Examiner* — Courtney Heinle
(74) *Attorney, Agent, or Firm* — Mori & Ward, LLP

(57) ABSTRACT

A driving force distribution control apparatus for a four-wheel drive vehicle includes a theoretical value calculator, a normative value calculator, and a servo controller. The theoretical value calculator is configured to calculate a primary rotational speed theoretical value of primary drive wheels and a secondary rotational speed theoretical value of secondary drive wheels based on a steering angle, a vehicle speed, a yaw rate, and a slip angle of the four-wheel drive vehicle and configured to calculate a rotational difference normative theoretical value indicating a difference between rotational speed theoretical values of input and output shafts of a drive force distribution apparatus using the primary rotational speed theoretical value and the secondary rotational speed theoretical value.

7 Claims, 6 Drawing Sheets

(56) References Cited

U.S. PATENT DOCUMENTS

| | | | |
|---|---|---|---|
| 5,899,951 A * | 5/1999 | Babbel et al. | 701/67 |
| 2003/0201131 A1* | 10/2003 | Maekawa et al. | 180/249 |
| 2007/0260388 A1* | 11/2007 | Watanabe | 701/70 |
| 2008/0227598 A1* | 9/2008 | Sigmund | 477/92 |
| 2014/0297141 A1* | 10/2014 | Nihanda et al. | 701/58 |
| 2014/0297150 A1* | 10/2014 | Ohyagi et al. | 701/89 |
| 2015/0112563 A1* | 4/2015 | Seki et al. | 701/69 |

FOREIGN PATENT DOCUMENTS

| | | | | |
|---|---|---|---|---|
| JP | 2005343419 A | * | 12/2005 | ........... B60K 17/348 |
| JP | 2006-056434 | | 3/2006 | |
| JP | 2007-302024 | | 11/2007 | |
| JP | 2008-007001 | | 1/2008 | |
| JP | 2008-143259 | | 6/2008 | |

\* cited by examiner

DRIVING FORCE DISTRIBUTION CONTROL APPARATUS FOR FOUR-WHEEL DRIVE VEHICLE AND DRIVING FORCE DISTRIBUTION CONTROL METHOD FOR FOUR-WHEEL DRIVE VEHICLE

CROSS-REFERENCE TO RELATED APPLICATIONS

The present application claims priority under 35 U.S.C. §119 to Japanese Patent Application No. 2013-069575, filed Mar. 28, 2013, entitled "Driving Force Distribution Control Apparatus for Four-wheel Drive Vehicle" and Japanese Patent Application No. 2013-229684, filed Nov. 5, 2013, entitled "Driving Force Distribution Control Apparatus for Four-wheel Drive Vehicle." The contents of these applications are incorporated herein by reference in their entirety.

BACKGROUND

1. Field

The present disclosure relates to a driving force distribution control apparatus for a four-wheel drive vehicle and a driving force distribution control method for a four-wheel drive vehicle.

2. Description of the Related Art

Japanese Unexamined Patent Application Publication No. 4-103433 describes a torque split four-wheel drive vehicle that directly transfers the driving force of an engine to one of front and rear wheels (a primary drive wheel) and a driving force divided by a torque split clutch to the other wheel (a secondary drive wheel). The technique for controlling the torque distribution ratio described in Japanese Unexamined Patent Application Publication No. 4-103433 is basically a technique for performing control to cause a difference in a rotational speed between the front and rear wheels to converge to zero and, in particular, a technique for detecting a difference between the diameters of the front and rear tires and performing driving force distribution control using the rotational speed difference between the front and rear tires corrected in accordance with the difference between the tire diameters and the vehicle speed. In addition, Japanese Unexamined Patent Application Publication No. 2007-302024 describes a technique for performing driving force distribution control while taking into account the lateral acceleration.

SUMMARY

According to one aspect of the present invention, a driving force distribution control apparatus for a four-wheel drive vehicle includes a theoretical value calculator, a normative value calculator, and a servo controller. The four-wheel drive vehicle includes a driving force transmission path via which a driving force generated by a drive source is transferred to primary drive wheels and secondary drive wheels, and a driving force distribution apparatus disposed in the driving force transmission path between the drive source and the secondary drive wheels. The theoretical value calculator is configured to calculate a primary rotational speed theoretical value of the primary drive wheels and a secondary rotational speed theoretical value of the secondary drive wheels based on a steering angle, a vehicle speed, a yaw rate, and a slip angle of the four-wheel drive vehicle and configured to calculate a rotational difference normative theoretical value indicating a difference between rotational speed theoretical values of input and output shafts of the drive force distribution apparatus using the primary rotational speed theoretical value and the secondary rotational speed theoretical value. The normative value calculator is configured to calculate a rotational difference normative value by correcting the rotational difference normative theoretical value based on a deviation between a measurement value of a rotational difference between the input and output shafts of the drive force distribution apparatus and the rotational difference normative theoretical value. The servo controller is configured to correct the driving force provided to the secondary drive wheels using the drive force distribution apparatus through servo control of the rotational difference measurement value. A target value of the servo control is the rotational difference normative value.

According to another aspect of the present invention, in a driving force distribution control method for a four-wheel drive vehicle, a driving force generated by a drive source is transferred to primary drive wheels and secondary drive wheels via a driving force transmission path. A primary rotational speed theoretical value of the primary drive wheels is calculated based on a steering angle, a vehicle speed, a yaw rate, and a slip angle of the four-wheel drive vehicle. A secondary rotational speed theoretical value of the secondary drive wheels is calculated based on a steering angle, a vehicle speed, a yaw rate, and a slip angle of the four-wheel drive vehicle. A rotational difference normative theoretical value indicating a difference between rotational speed theoretical values of input and output shafts of the drive force distribution apparatus is calculated using the primary rotational speed theoretical value and the secondary rotational speed theoretical value. A rotational difference normative value is calculated by correcting the rotational difference normative theoretical value based on a deviation between a measurement value of a rotational difference between the input and output shafts of the drive force distribution apparatus and the rotational difference normative theoretical value. The driving force provided to the secondary drive wheels using the drive force distribution apparatus is corrected through servo control of the rotational difference measurement value. A target value of the servo control is the rotational difference normative value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
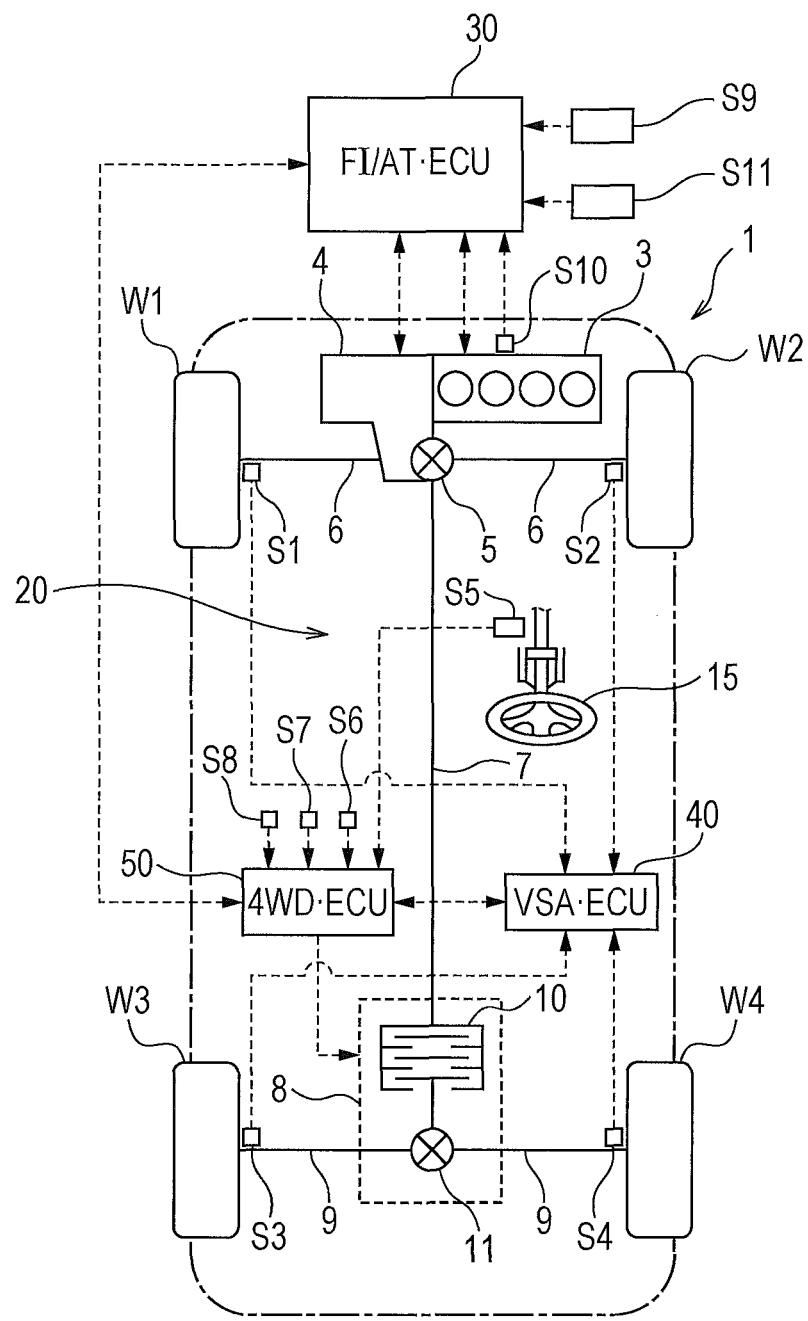
FIG. 1 is a schematic illustration of the configuration of a four-wheel drive vehicle including a driving force distribution control apparatus according to an exemplary embodiment of the present technology.

The embodiments will now be described with reference to the accompanying drawings, wherein like reference numerals designate corresponding or identical elements throughout the various drawings.

As illustrated in FIG. 1, a four-wheel drive vehicle 1 includes an engine (a drive source) 3 transversely mounted in the front of the vehicle 1, an automatic transmission 4 disposed with the engine 3 in an integrated manner, and a driving force transmission path 20 that transfers a driving force of the engine 3 to front wheels W1 and W2 and rear wheels W3 and W4.

An output shaft (not illustrated) of the engine 3 is connected to the left front wheel W1 and right front wheel W2, which are primary drive wheels, via the automatic transmission 4, a front differential 5 (hereinafter simply referred to as a "front diff"), and left and right front drive shafts 6 and 6. In addition, the output shaft of the engine 3 is connected to the left rear wheel W3 and the right rear wheel W4, which are secondary drive wheels, via the automatic transmission 4, the front diff 5, a propeller shaft 7, a rear differential unit 8 (hereinafter simply referred to as a "rear diff unit"), and left and right rear drive shafts 9 and 9.

The rear diff unit 8 includes a rear differential 11 (hereinafter simply referred to as a "rear diff"), and a front/rear torque split clutch 10. The rear diff 11 distributes the driving force to the right and left rear drive shafts 9 and 9. The front/rear torque split clutch 10 connects or disconnects the driving force transmission path 20 between the propeller shaft 7 and the rear diff 11. The front/rear torque split clutch 10 functions as a driving force distribution apparatus for controlling a driving force distribution ratio to the rear wheels W3 and W4 in the driving force transmission path 20. For example, the front/rear torque split clutch 10 is formed from an electromagnetic clutch. By controlling the driving force distributed to the rear wheels W3 and W4 using the front/rear torque split clutch 10, a 4WD-ECU 50 (described in more detail below) can perform drive control so that the front wheels W1 and W2 serve as primary drive wheels and the rear wheels W3 and W4 serve as secondary drive wheels.

That is, if the front/rear torque split clutch 10 is disengaged (disconnected), the rotation of the propeller shaft 7 is not transferred to the rear diff 11 and, thus, the entire torque of the engine 3 is transferred to the front wheels W1 and W2. Accordingly, the vehicle is driven in a front-wheel drive mode (a 2WD mode). In contrast, if the front/rear torque split clutch 10 is connected, the rotation of the propeller shaft 7 is transferred to the rear diff 11 and, thus, the torque of the engine 3 is distributed to the front wheels W1 and W2 and the rear wheels W3 and W4. Accordingly, the vehicle is driven in a four-wheel drive mode (a 4WD mode). At that time, the engagement power (the gripping quantity) of the front/rear torque split clutch 10 can be variably controlled. Thus, a driving force can be distributed to the rear wheels W3 and W4 (the secondary drive wheels) in accordance with the engagement power (the gripping quantity).

The four-wheel drive vehicle 1 further includes an FI/AT-ECU 30, a VSA (Vehicle Stability Assist)-ECU 40, and a 4WD-ECU 50, which are control units for controlling driving of the vehicle. Still furthermore, the four-wheel drive vehicle 1 includes a left front wheel speed sensor S1 that detects the wheel speed of the left front wheel W1 on the basis of the rotational speed of the left front drive shaft 6, a right front wheel speed sensor S2 that detects the wheel speed of the right front wheel W2 on the basis of the rotational speed of the right front drive shaft 6, a left rear wheel speed sensor S3 that detects the wheel speed of the left rear wheel W3 on the basis of the rotational speed of the left rear drive shaft 9, and a right rear wheel speed sensor S4 that detects the wheel speed of the right rear wheel W4 on the basis of the rotational speed of the right rear drive shaft 9. The four wheel speed sensors S1 to S4 detect the wheel speeds VW1 to VW4 of the left and right rear wheels W1 to W4, respectively. Detection signals of the wheel speeds VW1 to VW4 are sent to the VSA-ECU 40.

Yet still furthermore, the four-wheel drive vehicle 1 includes a steering angle sensor S5 that detects the steering angle of a steering wheel 15, a yaw rate sensor S6 that detects the yaw rate of the vehicle body, a lateral acceleration sensor S7 that detects the lateral acceleration of the vehicle body, and a vehicle speed sensor S8 that detects the speed of the vehicle body (the vehicle speed). The detection signals output from the steering angle sensor S5, the yaw rate sensor S6, the lateral acceleration sensor S7, and the vehicle speed sensor S8 are sent to the 4WD-ECU 50.

The FI/AT-ECU 30 serves as a control unit that controls the engine 3 and the automatic transmission 4. The FI/AT-ECU 30 is formed from a microcomputer including a random access memory (RAM), a read only memory (ROM), a central processing unit (CPU), and an I/O interface (none are illustrated). The FI/AT-ECU 30 receives a detection signal of a throttle position Th detected by a throttle position sensor S9, a detection signal of an engine speed Ne detected by an engine speed sensor S10, and a detection signal of a shift position detected by a shift position sensor S11. In addition, the FI/AT-ECU 30 has an engine torque map that describes a relationship among the engine speed Ne, the throttle position Th, and an engine torque estimation value Te. The FI/AT-ECU 30 calculates the engine torque estimation value Te on the basis of the throttle position Th detected by the throttle position sensor S9 and the engine speed Ne detected by the engine speed sensor S10.

The VSA-ECU 40 is a control unit having an ABS (Anti-lock Braking System) function that prevents wheel lock by performing anti-lock control on the left and right front wheels W1 and W2 and the left and right rear wheels W3 and W4 when braking is applied, a TCS (Traction Control System) function that prevents tire slip in acceleration, and a side slip prevention system function that works when the vehicle turns. By controlling the three functions, the VSA-ECU 40 can improve the stability characteristics of the vehicle. Like the FI/AT-ECU 30, the VSA-ECU 40 is formed from a microcomputer.

Like the FI/AT-ECU 30 and the VSA-ECU 40, the 4WD-ECU 50 is formed from a microcomputer. The 4WD-ECU 50 is connected to each of the FI/AT-ECU 30 and the VSA-ECU 40 with each other. Accordingly, the 4WD-ECU 50 receives the detection signals output from the wheel speed sensors S1 to S4 and the engine speed sensor S10 and information regarding the engine torque estimation value Te through serial communication with the FI/AT-ECU 30 and the VSA-ECU 40. Upon receipt of such input information, the 4WD-ECU 50 calculates, as described in more detail below, a driving force distributed to the rear wheels W3 and W4 and a corresponding drive electrical current value for the front/rear torque split clutch 10 on the basis of a control program stored in the ROM and the values of various flags and calculation values stored in the RAM. Thereafter, the 4WD-ECU 50 outputs a drive signal based on the result of the calculation to the front/rear torque split clutch 10. In this manner, the gripping force of the front/rear torque split clutch 10 is controlled, so that the driving force distributed to the rear wheels W3 and W4 is controlled.

Figure 2:
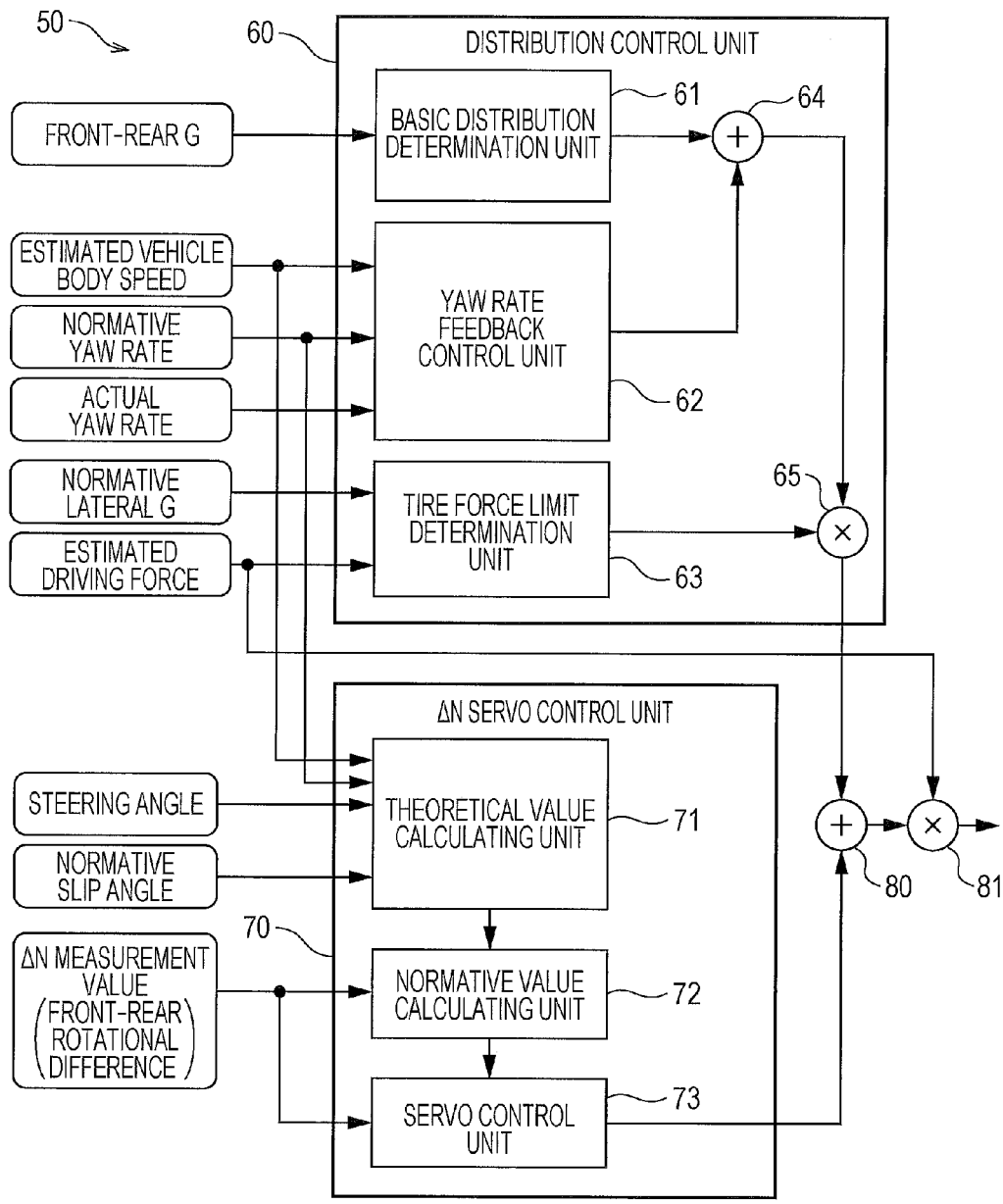
FIG. 2 is a block diagram schematically illustrating the control functions performed by a 4WD-ECU illustrated in FIG. 1 according to a first exemplary embodiment of the present technology.

FIG. 2 is a block diagram schematically illustrating the control functions performed by the 4WD-ECU 50 according to a first exemplary embodiment of the present technology. The control functions illustrated in FIG. 2 are performed by computer programs for the functions. A distribution control unit 60 determines a basic distribution control amount of a driving force applied to the rear wheels (the secondary drive wheels) W3 and W4 (a distribution ratio expressed as a decimal fraction between 0 to 1) on the basis of the load ratio between the front wheels (the primary drive wheels) W1 and W2 and the rear wheels (the secondary drive wheels) W3 and W4. A ΔN servo control unit 70 calculates a normative value (a target value) of a rotational difference (hereinafter simply referred to as a "ΔN") between the front wheels (the primary drive wheels) W1 and W2 and the rear wheels (the secondary drive wheels) W3 and W4. Thereafter, the ΔN servo control unit 70 performs servo control so that a measured value indicating an actual ΔN converges to the normative value (the target value). An adder unit 80 sums the basic distribution control amount determined by the distribution control unit 60 and a deviation signal for servo control output from the ΔN servo control unit 70 and outputs the sum as the driving force distribution value (a distribution ratio expressed as a decimal fraction between 0 to 1) for the rear wheels (the secondary drive wheels) W3 and W4. Note that as a final control amount, a value obtained by a multiplier unit 81 that multiplies an estimated driving force by the driving force distribution value (the distribution ratio) is output.

The distribution control unit 60 includes a basic distribution determination unit 61, a yaw rate feedback control unit 62, and a tire force limit determination unit 63. The basic distribution determination unit 61 estimates the vertical loads of the front and the rear wheels on the basis of the acceleration of the vehicle in the front-rear direction (referred to as "front-rear G"). Thereafter, the basic distribution determination unit 61 determines a basic determination ratio (a decimal fraction between 0 to 1), which is the ideal distribution ratio of the driving force applied to the rear wheels (the secondary drive wheels) W3 and W4, on the basis of the vertical load ratio. The yaw rate feedback control unit 62 calculates a correction value on the basis of a deviation between the actual yaw rate (yaw rate detection data output from the yaw rate sensor S6) and the normative yaw rate calculated on the basis of the steering angle and the vehicle speed and performs yaw rate feedback control. An adder unit 64 adds the correction value based on the calculated deviation of the yaw rate to the basic distribution ratio determined by the basic distribution determination unit 61. In this manner, the basic distribution ratio obtained by the basic distribution determination unit 61 is corrected through the yaw rate feedback control. The yaw rate feedback control can improve the controllability of the vehicle during a turn. The yaw rate feedback control unit 62 and the adder unit 64 function as a basic distribution correcting unit that corrects the basic distribution ratio determined by the basic distribution determination unit 61 in accordance with the driving conditions of the vehicle 1.

The tire force limit determination unit 63 calculates the preset-friction-coefficient-based tire force use ratio of the front wheels (the primary drive wheels) W1 and W2 on the basis of a normative lateral G (an acceleration applied to the vehicle body in the lateral direction) calculated using the estimated vehicle body speed (the vehicle speed) and the yaw rate (the turning angular velocity) and the estimated driving force. Thereafter, the tire force limit determination unit 63 controls the distribution ratio of the driving force to the rear wheels (the secondary drive wheels) W3 and W4 in accordance with the tire force limit. A distribution correction coefficient output from the tire force limit determination unit 63 is provided to a multiplier unit 65. Subsequently, the distribution correction coefficient is multiplied by the correction value of the ideal distribution value output from the adder unit 64. In this manner, the basic distribution ratio is corrected in accordance with the tire force use ratio of the front wheels (the primary drive wheels) W1 and W2. The corrected distribution value output from the multiplier unit 65 is output as the basic distribution control amount of the driving force applied to the rear wheels (the secondary drive wheels) W3 and W4.

The ΔN servo control unit 70 includes a theoretical value calculating unit 71, a normative value calculating unit 72, and a servo control unit 73. The theoretical value calculating unit 71 obtains the theoretical value of the rotational speed of the front wheels (the primary drive wheels) W1 and W2 and the theoretical value of the rotational speed of the rear wheels (the secondary drive wheels) W3 and W4 on the basis of the steering angle, estimated vehicle body speed (the vehicle speed), yaw rate, and slip angle of the vehicle 1. Thereafter, the theoretical value calculating unit 71 calculates a rotational difference normative theoretical value (referred to as a "ΔN normative theoretical value") indicating a difference between the theoretical values of the rotational speeds of the input and output shafts of the front/rear torque split clutch 10 on the basis of the two rotational speed theoretical values. The normative value calculating unit 72 calculates a rotational difference normative value by correcting the rotational difference normative theoretical value on the basis of a deviation between the actual measurement value of the rotational difference ΔN between the input and output shafts of the front/rear torque split clutch 10 (hereinafter referred to as a "ΔN measurement value") and the rotational difference normative theoretical value. Note that for example, the ΔN measurement value is calculated as a difference between the rotational speed of the input shaft of the front/rear torque split clutch 10 obtained on the basis of the average speed of the front axle based on the outputs of the front wheel speed sensors S1 and S2 provided on the front drive shafts 6 and a gear ratio from the input shaft of the front/rear torque split clutch 10 (the rotary shaft of the front-wheel clutch) to the front drive shafts 6 and the rotational speed of the output shaft of the front/rear torque split clutch 10 obtained on the basis of the average speed of the rear axle based on the outputs of the rear wheel speed sensors S3 and S4 provided on the rear drive shafts 9 and a gear ratio from the output shaft of the front/rear torque split clutch 10 (the rotary shaft of the rear-wheel clutch) to the rear drive shafts 9. Alternatively, a rotation sensor may be provided on each of the input shaft and the output shaft of the front/rear torque split clutch (the driving force distribution apparatus) 10, and a difference between the measured rotational speeds of the input and output shafts of the clutch may be calculated. Still alternatively, the measurement (calculation) may be performed by using any appropriate measurement technique. According to the present exemplary embodiment, the clutch rotational difference ΔN is defined as a value obtained by subtracting the rotational speed of the output shaft of the front/rear torque split clutch 10 (on the secondary drive wheel side) from the rotational speed of the input shaft of the front/rear torque split clutch 10 (on the primary drive wheel side). The servo control unit 73 corrects the driving force biased to the rear wheels (the secondary drive wheels) W3 and W4 by the front/rear torque split clutch (the driving force distribution apparatus) 10 through servo control of a measurement value of the rotational difference ΔN, the target value of which is the rotational difference normative value calculated by the normative value calculating unit 72. In this manner, an optimal rotational difference normative value can be obtained in accordance with a variation in the vehicle condition that cannot be corrected by using only the theoretical value, and driving force distribution to the rear wheels (the secondary drive wheels) W3 and W4 can be controlled on the basis of the obtained optimal rotational difference normative value.

The $\Delta N$ servo control unit 70 is described in more detail below with reference to FIG. 3. For example, the theoretical value calculating unit 71 obtains the rotational speed theoretical value of the rotary shaft (the input shaft) of the front/rear torque split clutch 10 on the "front wheels (the primary drive wheels) W1 and W2" side and the rotational speed theoretical value of the rotary shaft (the output shaft) of the front/rear torque split clutch 10 on the "rear wheels (the secondary drive wheels) W3 and W4" side and, thereafter, calculates the rotational difference normative theoretical value (the $\Delta N$ normative theoretical value) indicating the difference between the two rotational speed theoretical values as follows:

Clutch input shaft rotational speed theoretical value=$A\{V \cdot \cos(\delta-\beta)+\gamma \cdot L_f \sin \delta\}$, Clutch output shaft rotational speed theoretical value=$B \cdot V \cdot \cos \beta$, and $\Delta N$ normative theoretical value=clutch input shaft rotational speed theoretical value−clutch output shaft rotational speed theoretical value.

Figure 4:
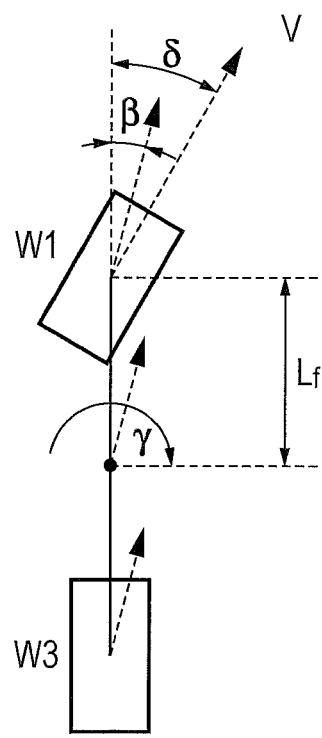
FIG. 4 illustrates a vehicle two-wheel model.

The above-described equations are provided on the basis of a well-known ideal vehicle two-wheel model illustrated in FIG. 4, where $\delta$ denotes the steering angle, $\beta$ denotes the normative slip angle, $\gamma$ denotes the normative yaw rate, $L_f$ denotes the distance between the center of gravity of the vehicle and the front drive shaft 6, V denotes the vehicle body speed, A denotes the coefficient for converting the vehicle speed into the rotational speed of the front wheel rotary shaft of the front/rear torque split clutch 10, and B denotes the coefficient for converting the vehicle speed into the rotational speed of the rear wheel rotary shaft of the front/rear torque split clutch 10. The front wheel conversion coefficient A is determined in accordance with, for example, the tire dynamic load radius of the front wheels (the primary drive wheels) W1 and W2, the front wheel drive gear ratio, and the hypoid gear ratio. The rear wheel conversion coefficient B is determined in accordance with, for example, the tire dynamic load radius of the rear wheels (the secondary drive wheels) W3 and W4 and a rear wheel diff gear ratio. Note that the normative yaw rate $\gamma$ is calculated on the basis of an ideal vehicle two-wheel model using the current vehicle speed V and the steering angle $\delta$ of the vehicle 1. In addition, the normative slip angle $\beta$ is calculated on the basis of the ideal vehicle two-wheel model using the current vehicle speed V, the front-rear G, and the lateral G of the vehicle 1.

Figure 3:
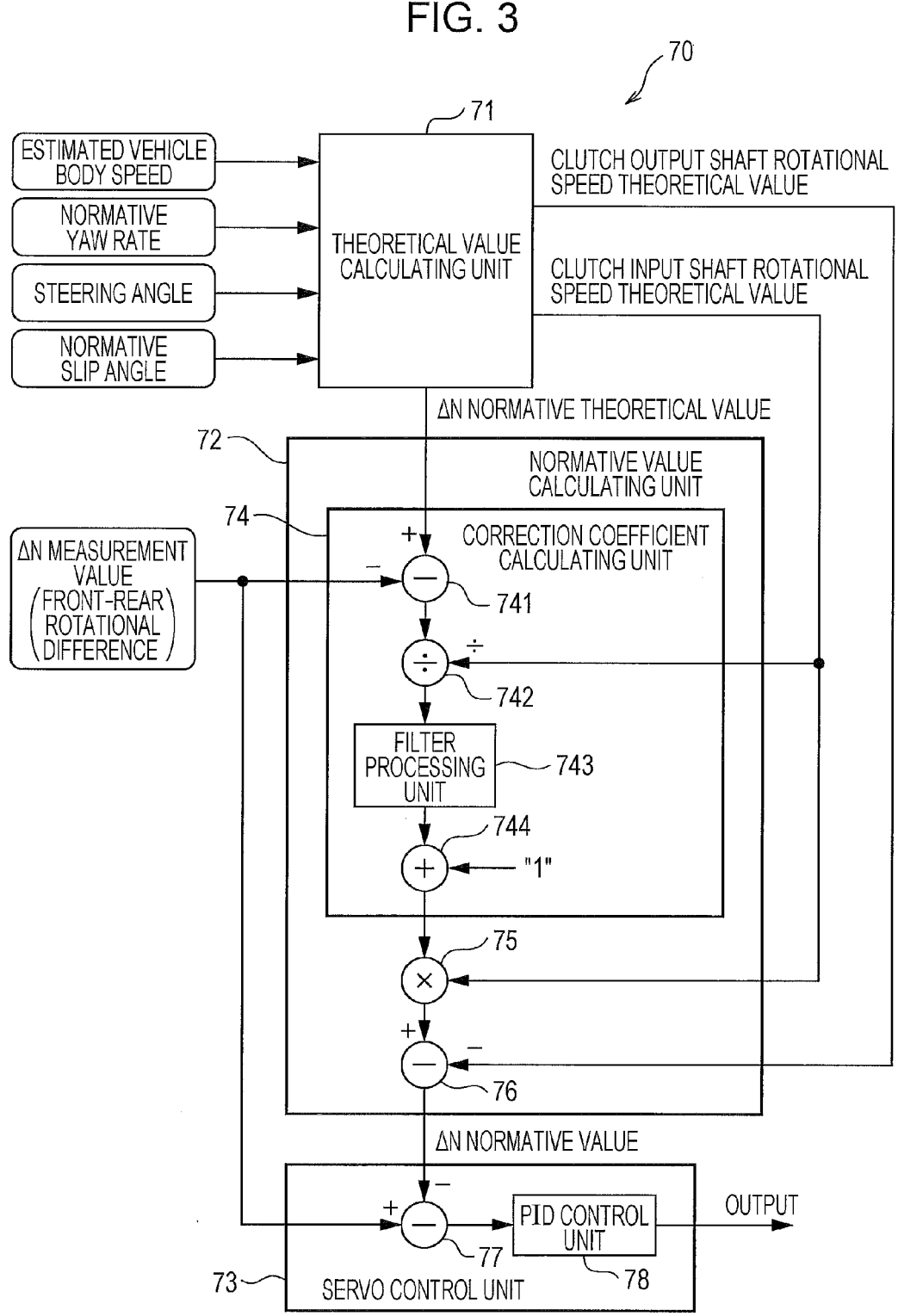
FIG. 3 is a block diagram illustrating the details of a $\Delta N$ servo control unit illustrated in FIG. 2.

As illustrated in FIG. 3, the normative value calculating unit 72 includes a correction coefficient calculating unit 74. The correction coefficient calculating unit 74 calculates a correction coefficient used for correcting the $\Delta N$ normative theoretical value calculated by the theoretical value calculating unit 71 in accordance with an actual $\Delta N$ measurement value. In the correction coefficient calculating unit 74, a subtractor unit 741 subtracts the $\Delta N$ measurement value from the $\Delta N$ normative theoretical value calculated by the theoretical value calculating unit 71. Thus, the subtractor unit 741 obtains a deviation between the actual $\Delta N$ measurement value and the $\Delta N$ normative theoretical value (a deviation between an actual value and a theoretical value). A divider unit 742 divides the deviation obtained by the subtractor unit 741 by the clutch input shaft rotational speed theoretical value calculated by the theoretical value calculating unit 71 so as to obtain the ratio of the deviation to the clutch input shaft rotational speed theoretical value. That is, the divider unit 742 converts the deviation between the actual value and the theoretical value of the input/output shaft rotational difference $\Delta N$ of the front/rear torque split clutch 10 into the ratio of the deviation to the clutch input shaft rotational speed theoretical value. The output of the divider unit 742 is input to a filter processing unit 743. The output of the divider unit 742 is a value including a positive or negative decimal fraction close to "0". The filter processing unit 743 performs lowpass filter processing on the output so that the driving force distribution apparatus does not respond to a temporary change in the input signal. The output of the filter processing unit 743 is provided to an adder unit 744 and is added to a reference coefficient value of "1". The output of the filter processing unit 743 is a value including a positive or negative decimal fraction close to "0" and eases a temporary (or abrupt) change. Thus, the output is in a region in which the vehicle behavior is stable. The output of the adder unit 744 is output as the correction coefficient calculated by the correction coefficient calculating unit 74. The correction coefficient is a value including a decimal fraction close to "1". As can be seen from the above description, the correction coefficient serves as a ratio to the clutch input shaft rotational speed theoretical value.

The correction coefficient output from the adder unit 744 is input to a multiplier unit 75 and is multiplied by the clutch input shaft rotational speed theoretical value calculated by the theoretical value calculating unit 71. In this manner, the clutch input shaft rotational speed theoretical value calculated by the theoretical value calculating unit 71 is corrected using the correction coefficient. That is, the clutch input shaft rotational speed theoretical value is corrected to a value obtained by taking into account the deviation between the actual value and the theoretical value of the rotational difference $\Delta N$ between the input and output shafts of the front/rear torque split clutch 10. The output of the multiplier unit 75 is input to a subtractor unit 76, and a difference between the output and the clutch output shaft rotational speed theoretical value calculated by the theoretical value calculating unit 71 is calculated. That is, the clutch output shaft rotational speed theoretical value is subtracted from the clutch input shaft rotational speed theoretical value corrected by taking into account the deviation between the actual value and the theoretical value of a front-rear rotational difference $\Delta N$. Thus, a normative value of the corrected clutch rotational difference $\Delta N$ based on the theoretical value can be obtained. In this manner, a rotational difference normative value (referred to as a "$\Delta N$ normative value") obtained by correcting the $\Delta N$ normative theoretical value can be obtained from the subtractor unit 76 on the basis of the deviation between the actual $\Delta N$ measurement value and the $\Delta N$ normative theoretical value.

The $\Delta N$ normative value calculated by the normative value calculating unit 72 in this manner is input to a subtractor unit 77 of the servo control unit 73 and is subtracted from the $\Delta N$ measurement value. The output of the subtractor unit 77 serves as the deviation value "$\Delta N$ measurement value−$\Delta N$ normative value" used for servo control and is input to a PID (proportion/integration/differential) control unit 78. The output of the PID control unit 78 serves as a servo control output signal for the $\Delta N$ servo control unit 70, is input to the adder unit 80 (refer to FIG. 2), and is added to the basic distribution control amount (if the output of the PID control unit 78 is negative, the output is subtracted from the basic distribution control amount). The gripping force of the front/rear torque split clutch (the driving force distribution apparatus) 10 is variably controlled in accordance with the output of the adder unit 80. In this manner, the servo control is performed so that the driving force biased to the rear wheels (the secondary drive wheels) W3 and W4 by the front/rear torque split clutch (the driving force distribution apparatus) 10 is corrected. For example, if the driving force biased to the rear wheels (the secondary drive wheels) W3 and W4 is insufficient, the deviation value "ΔN measurement value–ΔN normative value" output from the subtractor unit 77 is positive. Accordingly, the servo control is performed so that the driving force biased to the rear wheels (the secondary drive wheels) W3 and W4 increases. In contrast, if the driving force biased to the rear wheels (the secondary drive wheels) W3 and W4 is excessive, the deviation value "ΔN measurement value–ΔN normative value" output from the subtractor unit 77 is negative. Accordingly, the servo control is performed so that the driving force biased to the rear wheels (the secondary drive wheels) W3 and W4 decreases.

Through the above-described configuration, the theoretical value calculating unit 71 calculates a theoretical clutch rotational difference in accordance with the driving conditions of the vehicle as the ΔN normative theoretical value. However, the calculated value is not directly used as the normative value (the target value) of servo control. The normative value calculating unit 72 corrects the ΔN normative theoretical value to obtain the ΔN normative value on the basis of the deviation between the ΔN normative theoretical value and the actual ΔN measurement value. In this manner, an optimal ΔN normative value can be obtained in adapting to a variation that cannot be compensated for by the theoretical value. That is, if a deviation between the ΔN normative theoretical value and the ΔN measurement value appears at all times, it is considered that such a deviation occurs due to a normally occurring variation (e.g., a variation in a tire diameter, a sensor error, or a setting error in a normative model). Thus, the normative value calculating unit 72 detects such a normally occurring variation, calculates a correction coefficient corresponding to the normally occurring variation by using the correction coefficient calculating unit 74, and obtains the ΔN normative value corrected by using the correction coefficient. By obtaining the optimal ΔN normative value in adapting to the variation that cannot be compensated for by the theoretical value and performing servo control so that the ΔN measurement value converges to the ΔN normative value, the traction performance and the controllability of the vehicle during a turn in the case where friction coefficients of the front and rear wheels (the primary and secondary drive wheels) differ from each other can be improved. In addition, driving force distribution control can be performed in adapting to the variation. Furthermore, the risk caused by a sensor error or a setting error in the normative model can be reduced.

While the above exemplary embodiment has been described with reference to the normative value calculating unit 72 that corrects the clutch input shaft rotational speed theoretical value using the correction coefficient, the technique is not limited thereto. For example, the clutch output shaft rotational speed theoretical value may be corrected, or both the clutch input shaft rotational speed theoretical value and the clutch output shaft rotational speed theoretical value may be corrected. Alternatively, calculation may be performed so that the ΔN normative theoretical value is directly corrected. In addition, an embodiment of the present technology may be applied to a configuration in which the rear wheels function as the primary drive wheels and the front wheels function as the secondary drive wheels. The front/rear torque split clutch (the driving force distribution apparatus) 10 is not limited to an electromagnetic clutch. For example, the front/rear torque split clutch 10 may be a fluid pressure clutch.

Figure 5:
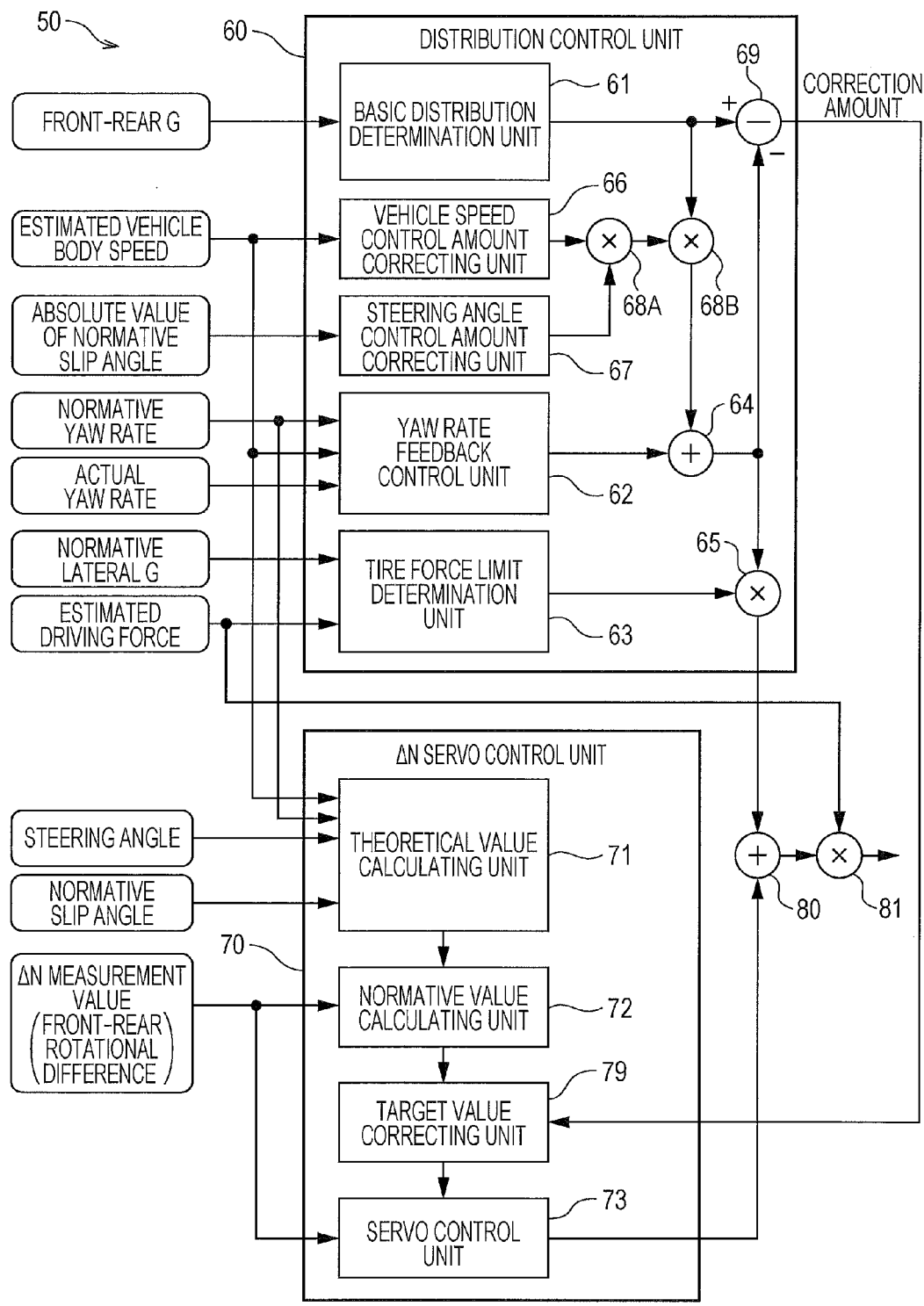
FIG. 5 is a block diagram schematically illustrating the control functions performed by a 4WD-ECU illustrated in FIG. 1 according to a second exemplary embodiment of the present technology.

FIG. 5 illustrates a second exemplary embodiment of the present technology. The same numbering is used for the same elements in FIG. 5 as in FIG. 2, and description of the element is not repeated. According to the second exemplary embodiment, the level of correction (adjustment) performed on the basic distribution ratio determined by the basic distribution determination unit 61 in accordance with the driving conditions of the vehicle in, for example, the yaw rate feedback control is reflected in the difference rotation control performed by the ΔN servo control unit 70. According to the second exemplary embodiment, the factors for adding correction (adjustment) to the basic distribution ratio determined by the basic distribution determination unit 61 in accordance with the driving conditions of the vehicle include vehicle speed control and steering angle control in addition to the yaw rate feedback control. However, the factors for adding correction (adjustment) in accordance with the driving conditions of the vehicle are not limited to the three factors. For example, another factor may be employed, or at least one of the factors and/or the elements may be employed.

If the basic distribution ratio based on the front-rear load ratio obtained by the basic distribution determination unit 61 is employed, over-steering tends to occur. To prevent such over-steering tendency, a vehicle speed control amount correcting unit 66 and a steering angle control amount correcting unit 67 are provided. The vehicle speed control amount correcting unit 66 generates a correction coefficient in accordance with the estimated vehicle body speed (the vehicle speed). The vehicle speed control amount correcting unit 66 has, for example, a table storing a pair of a correction coefficient and a corresponding estimated vehicle body speed (a vehicle speed). The steering angle control amount correcting unit 67 generates a correction coefficient in accordance with the absolute value of a normative slip angle. The steering angle control amount correcting unit 67 has, for example, a table storing a pair of a correction coefficient and a corresponding absolute value of a normative slip angle.

The correction coefficients generated by the vehicle speed control amount correcting unit 66 and the steering angle control amount correcting unit 67 are multiplied by each other by a multiplier unit 68A. The product, which serves as a correction coefficient, is multiplied by the basic distribution ratio calculated by the basic distribution determination unit 61 by a multiplier unit 68B. In this manner, the basic distribution ratio obtained by the basic distribution determination unit 61 is corrected in accordance with the estimated vehicle body speed (the vehicle speed) and the normative slip angle so that the over-steering tendency is eliminated. The corrected basic distribution ratio is provided to the adder unit 64. Thereafter, in the same manner as described above, correction is made in accordance with the correction value based on the yaw rate deviation output from the yaw rate feedback control unit 62. The corrected basic distribution ratio output from the adder unit 64 is input to the multiplier unit 65. According to the second exemplary embodiment, part of the yaw rate feedback control unit 62, the vehicle speed control amount correcting unit 66, the steering angle control amount correcting unit 67, the multiplier units 68A and 68B, and the adder unit 64 corresponds to the basic distribution correcting unit that corrects the basic distribution ratio determined by the basic distribution determination unit 61 in accordance with the driving conditions of the vehicle. A configuration including any one of the yaw rate feedback control unit 62, the vehicle speed control amount correcting unit 66, and the steering angle control amount correcting unit 67 may be employed.

A subtractor unit 69 subtracts the corrected basic distribution ratio output from the adder unit 64 from the basic distribution ratio calculated by the basic distribution determination unit 61. Thus, the subtractor unit 69 calculates the correction amount added to the basic distribution ratio. The calculated correction amount is input to a target value correcting unit 79.

Figure 6:
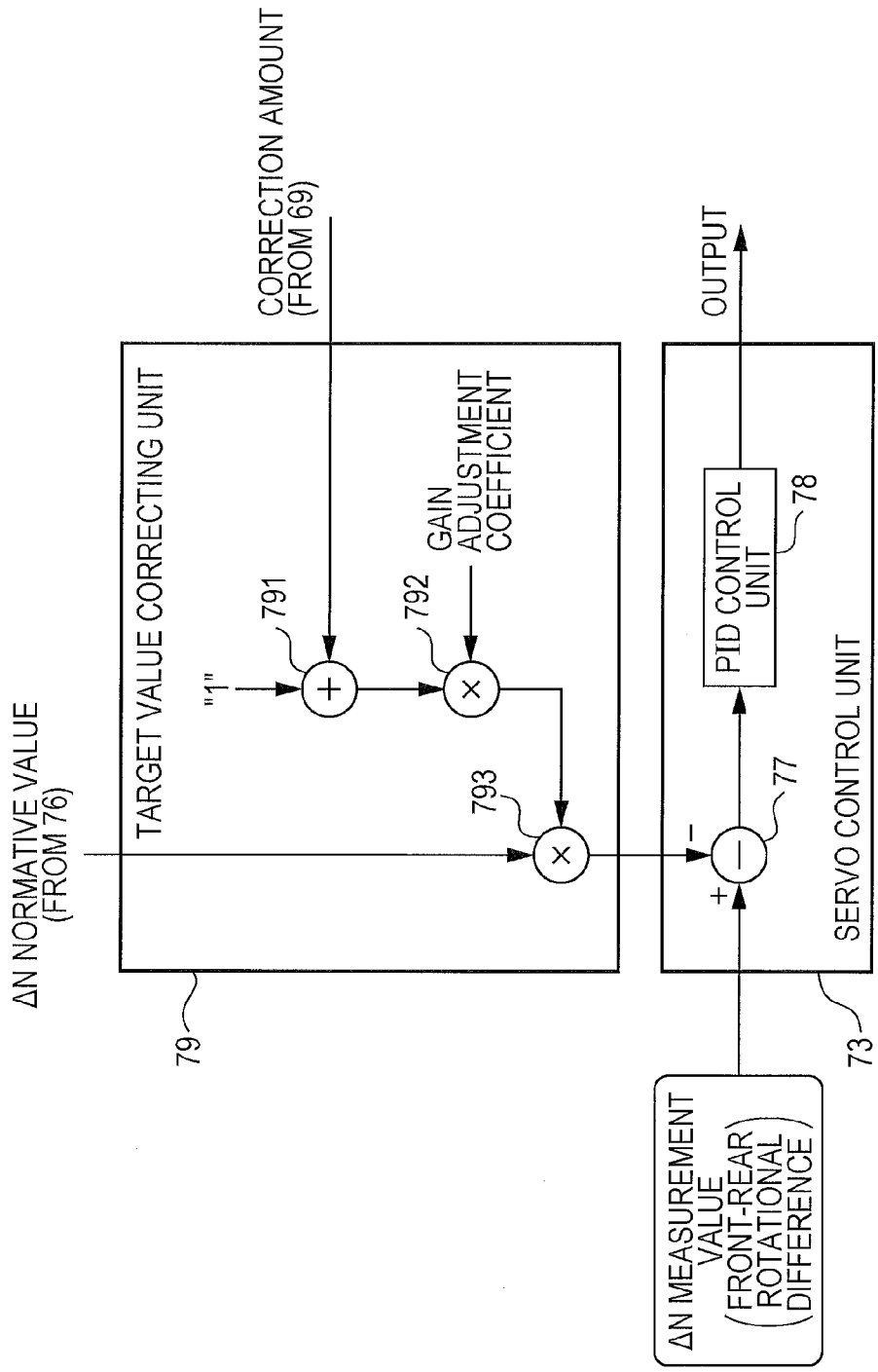
FIG. 6 is a block diagram illustrating the details of a target value correcting unit illustrated in FIG. 5.

The target value correcting unit 79 corrects the rotational difference normative value (the ΔN normative value) which serves as a target value of the servo control unit 73 on the basis of the correction amount calculated by the subtractor unit 69. FIG. 6 illustrates a particular example of the target value correcting unit 79. The correction amount output from the subtractor unit 69 is input to an adder unit 791 and is converted into a coefficient for multiplication (a "1"-based coefficient). A multiplier unit 792 multiplies the output of the adder unit 791 by a variable gain adjustment coefficient. Thereafter, a multiplier unit 793 multiplies the product by the ΔN normative value calculated by the normative value calculating unit 72 (the output of the subtractor unit 76 illustrated in FIG. 3). Note that in order to increase the gain, the gain adjustment coefficient is set to a value greater than 1 (including a decimal fraction). The output of the multiplier unit 793 serves as a target value used for servo control and is input to the subtractor unit 77 of the servo control unit 73. In this manner, the target value correcting unit 79 corrects the rotational difference normative value (the ΔN normative value) serving as the target value used for servo control performed by the servo control unit 73 on the basis of the correction amount of the basic distribution ratio calculated by the basic distribution correcting unit (the output of the subtractor unit 69).

According to the second exemplary embodiment, through such a configuration, when, for example, the basic distribution ratio calculated by the basic distribution determination unit 61 (the distribution ratio of the driving force biased to the rear wheel to that biased to the front wheel) is "0.42" and if the corrected basic distribution ratio output from the adder unit 64 is "0.2", the correction amount output from the subtractor unit 69 is "0.22". At that time, let k be the gain adjustment coefficient. Then, the output of the multiplier unit 792 is 1.22 k. The ΔN normative value output from the subtractor unit 76 (refer to FIG. 3) is increased by 1.22 k times. Thus, the rotational difference normative value (the ΔN normative value) serving as the target value of servo control is corrected so as to increase. An increase in the rotational difference normative value (the ΔN normative value) causes a decrease in a rear wheel driving force relative to a front wheel driving force. That is, control is performed so that when the basic distribution ratio for the rear wheel decreases in accordance with the driving conditions of the vehicle, the rotational difference normative value (the ΔN normative value) serving as the target value of the servo control increases (that is, the rear wheel driving force relatively decreases). In this manner, the target value of the difference rotation servo control can be modified so that the differential rotation servo control is optimally performed in accordance with the driving conditions of the vehicle. Thus, the maneuverability of the vehicle can be further stably increased, as compared with that of the vehicles including an existing driving force distribution control apparatus.

According to an embodiment of the present technology, a driving force distribution control apparatus for a four-wheel drive vehicle is provided. The four-wheel drive vehicle includes a driving force transmission path (20) that transfers a driving force from a drive source (3) to primary drive wheels and secondary drive wheels and a driving force distribution apparatus (10) disposed in the driving force transmission path between the drive source and the secondary drive wheels. The driving force distribution control apparatus includes a theoretical value calculating unit (71) configured to calculate a rotational speed theoretical value of the primary drive wheel and a rotational speed theoretical value of the secondary drive wheel on the basis of a steering angle, a vehicle speed, a yaw rate, and a slip angle of the four-wheel drive vehicle and calculate a rotational difference normative theoretical value indicating a difference between rotational speed theoretical values of input and output shafts of the drive force distribution apparatus using the two rotational speed theoretical values of the drive wheels, a normative value calculating unit (72) configured to calculate a rotational difference normative value by correcting the rotational difference normative theoretical value on the basis of a deviation between a measurement value of a rotational difference between the input and output shafts of the drive force distribution apparatus and the rotational difference normative theoretical value, and a servo control unit (73) configured to correct the driving force biased to the secondary drive wheels using the drive force distribution apparatus through servo control of the rotational difference measurement value, a target value of which is the rotational difference normative value. Note that the above-described reference symbols between parentheses indicate corresponding components of an exemplary embodiments described below only for the purpose of reference.

According to the embodiment of the present technology, the rotational speed theoretical value of the primary drive wheel and the rotational speed theoretical value of the secondary drive wheel are calculated on the basis of the steering angle, the vehicle speed, the yaw rate, and the slip angle of the vehicle. By using the calculated values, a rotational difference normative theoretical value indicating the difference between rotational speed theoretical values of the input and output shafts of the drive force distribution apparatus is obtained. In this manner, the rotational difference between the input and output shafts of the drive force distribution apparatus is calculated as a rotational difference normative theoretical value in accordance with the driving conditions of the vehicle. Thereafter, by using a deviation between the rotational difference normative theoretical value and an actual measurement value of the rotational difference between the input and output shafts of the driving force distribution apparatus, a rotational difference normative value is obtained by correcting the rotational difference normative theoretical value. In this manner, the optimal rotational difference normative value can be obtained in adapting to the variation that cannot be compensated for by the theoretical value (e.g., a vehicle-to-vehicle variation in a tire diameter, a vehicle specific sensor error, or a setting error in the normative model). Thereafter, by performing servo control so that the rotational difference measurement value is the same as the rotational difference normative value, the traction performance and the controllability of the vehicle during a turn in the case where friction coefficients of the front and rear wheels (the primary and secondary drive wheels) differ from each other can be improved. In addition, driving force distribution control can be performed in adapting to the variation. Furthermore, the risk caused by a sensor error or a setting error in the normative model can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A driving force distribution control apparatus for a four-wheel drive vehicle including a driving force transmission path via which a driving force generated by a drive source is transferred to primary drive wheels and secondary drive wheels, and a driving force distribution apparatus disposed in the driving force transmission path between the drive source and the secondary drive wheels, the driving force distribution control apparatus comprising:
   a theoretical value calculator configured to calculate a primary rotational speed theoretical value of the primary drive wheels and a secondary rotational speed theoretical value of the secondary drive wheels based on a steering angle, a vehicle speed, a yaw rate, and a slip angle of the four-wheel drive vehicle and configured to calculate a rotational difference normative theoretical value indicating a difference between rotational speed theoretical values of input and output shafts of the drive force distribution apparatus using the primary rotational speed theoretical value and the secondary rotational speed theoretical value;
   a normative value calculator configured to calculate a rotational difference normative value by correcting the rotational difference normative theoretical value based on a deviation between a measurement value of a rotational difference between the input and output shafts of the drive force distribution apparatus and the rotational difference normative theoretical value; and
   a servo controller configured to correct the driving force provided to the secondary drive wheels using the drive force distribution apparatus through servo control of the rotational difference measurement value, a target value of the servo control being the rotational difference normative value.

2. The driving force distribution control apparatus for a four-wheel drive vehicle according to claim 1, wherein the normative value calculator includes a correction coefficient calculator configured to calculate a correction coefficient used for correcting the rotational difference normative theoretical value based on a deviation between the rotational difference measurement value between the primary drive wheel and the secondary drive wheel and the rotational difference normative theoretical value and an arithmetic device configured to calculate the rotational difference normative value by correcting the rotational difference normative theoretical value in accordance with the correction coefficient.

3. The driving force distribution control apparatus for a four-wheel drive vehicle according to claim 1, further comprising:
   a basic distribution determination device configured to determine a basic distribution ratio for a driving force provided to the secondary drive wheel based on a load ratio between the primary drive wheel and the secondary drive wheel.

4. The driving force distribution control apparatus for a four-wheel drive vehicle according to claim 1, wherein the normative value calculator includes a filter element that prevents a change in the rotational difference normative value in response to a temporary change in the deviation between the rotational difference measurement value and the rotational difference normative theoretical value.

5. The driving force distribution control apparatus for a four-wheel drive vehicle according to claim 3, further comprising:
   a basic distribution corrector configured to correct the basic distribution ratio determined by the basic distribution determination device in accordance with driving conditions of the vehicle; and
   a target value corrector configured to correct the rotational difference normative value serving as the target value set for the servo controller based on a correction amount of the basic distribution ratio output from the basic distribution corrector.

6. A driving force distribution control apparatus for a four-wheel drive vehicle including a driving force transmission path via which a driving force generated by a drive source is transferred to primary drive wheels and secondary drive wheels, and a driving force distribution apparatus disposed in the driving force transmission path between the drive source and the secondary drive wheels, the driving force distribution control apparatus comprising:
   primary rotational speed theoretical value calculating means for calculating a primary rotational speed theoretical value of the primary drive wheels based on a steering angle, a vehicle speed, a yaw rate, and a slip angle of the four-wheel drive vehicle;
   secondary rotational speed theoretical value calculating means for calculating a secondary rotational speed theoretical value of the secondary drive wheels based on a steering angle, a vehicle speed, a yaw rate, and a slip angle of the four-wheel drive vehicle;
   rotational difference normative theoretical value calculating means for calculating a rotational difference normative theoretical value indicating a difference between rotational speed theoretical values of input and output shafts of the drive force distribution apparatus using the primary rotational speed theoretical value and the secondary rotational speed theoretical value;
   normative value calculating means for calculating a rotational difference normative value by correcting the rotational difference normative theoretical value based on a deviation between a measurement value of a rotational difference between the input and output shafts of the drive force distribution apparatus and the rotational difference normative theoretical value; and
   servo controlling means for correcting the driving force provided to the secondary drive wheels using the drive force distribution apparatus through servo control of the rotational difference measurement value, a target value of the servo control being the rotational difference normative value.

7. A driving force distribution control method for a four-wheel drive vehicle, the method comprising:
   transferring a driving force generated by a drive source to primary drive wheels and secondary drive wheels via a driving force transmission path;
   calculating a primary rotational speed theoretical value of the primary drive wheels based on a steering angle, a vehicle speed, a yaw rate, and a slip angle of the four-wheel drive vehicle;
   calculating a secondary rotational speed theoretical value of the secondary drive wheels based on a steering angle, a vehicle speed, a yaw rate, and a slip angle of the four-wheel drive vehicle;
   calculating a rotational difference normative theoretical value indicating a difference between rotational speed theoretical values of input and output shafts of the drive force distribution apparatus using the primary rotational speed theoretical value and the secondary rotational speed theoretical value;

calculating a rotational difference normative value by correcting the rotational difference normative theoretical value based on a deviation between a measurement value of a rotational difference between the input and output shafts of the drive force distribution apparatus and the rotational difference normative theoretical value; and correcting the driving force provided to the secondary drive wheels using the drive force distribution apparatus through servo control of the rotational difference measurement value, a target value of the servo control being the rotational difference normative value.

\* \* \* \* \*